(12) United States Patent
Schlichter et al.

(10) Patent No.: US 12,090,430 B2
(45) Date of Patent: Sep. 17, 2024

(54) METHOD OF PRODUCING A MULTILAYER FILTER MEDIUM AND A FILTER MEDIUM PRODUCED IN ACCORDANCE WITH THIS METHOD

(71) Applicant: HYDAC PROCESS TECHNOLOGY GMBH, Neunkirchen (DE)

(72) Inventors: Bernhard Schlichter, Saarbrücken (DE); Martin Winter, Wadern (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 442 days.

(21) Appl. No.: 17/617,409

(22) PCT Filed: Sep. 28, 2020

(86) PCT No.: PCT/EP2020/077105
§ 371 (c)(1),
(2) Date: Dec. 8, 2021

(87) PCT Pub. No.: WO2021/058821
PCT Pub. Date: Apr. 1, 2021

(65) Prior Publication Data
US 2022/0241708 A1 Aug. 4, 2022

(30) Foreign Application Priority Data
Sep. 28, 2019 (DE) .................... 10 2019 006 765.7

(51) Int. Cl.
*B01D 39/10* (2006.01)
*B01D 39/08* (2006.01)
(Continued)

(52) U.S. Cl.
CPC ........... *B01D 39/10* (2013.01); *B01D 39/083* (2013.01); *B01D 39/1623* (2013.01);
(Continued)

(58) Field of Classification Search
CPC ........ B01D 27/00; B01D 27/02; B01D 27/04; B01D 27/13; B01D 35/005; B01D 39/00;
(Continued)

(56) References Cited

U.S. PATENT DOCUMENTS

2011/0232653 A1    9/2011  Imashiro et al.
2013/0146529 A1    6/2013  Schwender et al.
2014/0332476 A1*  11/2014  Pourdeyhimi ......... B01D 39/14
                                                                    156/277

FOREIGN PATENT DOCUMENTS

DE              102 20 273      11/2003
DE         10 2008 005 794       7/2009
(Continued)

OTHER PUBLICATIONS

International Search Report (ISR) issued Dec. 22, 2020 in International (PCT) Application No. PCT/EP2020/077105.

*Primary Examiner* — Allison G Fitzsimmons
(74) *Attorney, Agent, or Firm* — WENDEROTH, LIND & PONACK, L.L.P.

(57) ABSTRACT

The invention relates to a method of producing a multilayer filter medium, including at least the production steps of providing a woven fabric layer (12) having passage points (24) for fluid, providing a nonwoven layer of a spunbonded nonwoven (18) and having additional passage points (28) for fluid, and joining the two superimposed layers (12, 18) along contact points (30) by melting the nonwoven layer (18) in such a way that while the additional passage points (28) enlarge, the molten spunbonded nonwoven material flows at least in part to the contact points (30) and then cumulatively curs there to produce firm connection points between the two layers (12, 18).

15 Claims, 2 Drawing Sheets

(51) Int. Cl.
  *B01D 39/16*   (2006.01)
  *D03D 13/00*   (2006.01)
  *D03D 15/67*   (2021.01)

(52) U.S. Cl.
  CPC ........... *D03D 13/004* (2013.01); *D03D 15/67* (2021.01); *B01D 2239/0654* (2013.01); *B01D 2239/0668* (2013.01); *B01D 2239/1233* (2013.01); *D10B 2505/04* (2013.01)

(58) Field of Classification Search
  CPC ........ B01D 39/02; B01D 39/06; B01D 39/08; B01D 39/086; B01D 39/10; B01D 39/14; B01D 39/16; B01D 39/20; B01D 2101/00; B01D 2101/005; B01D 2202/0407; B01D 2239/00; B01D 2239/02; B01D 2239/04; B01D 2239/06; B01D 2239/065; B01D 2239/0654; B01D 2239/0659; B01D 2239/0669; B01D 2239/0667; B01D 2239/10; C02F 1/003; C02F 1/283; C02F 2001/425; D04H 1/559; D04H 1/407; D04H 1/413; D04H 1/42; D04H 1/4374; D04H 1/43825; D04H 1/43835; D04H 1/43838; D04H 1/56; D04H 3/02; D04H 3/14; B32B 2250/03; B32B 2250/20; B32B 2250/40; B32B 2255/02; B32B 2255/26; B32B 2255/28; B32B 2262/0276; B32B 2262/0284; B32B 2305/026; B32B 2305/20; B32B 2305/28; B32B 2307/726; B32B 5/022; B32B 5/26

See application file for complete search history.

(56) References Cited

FOREIGN PATENT DOCUMENTS

| | | |
|---|---|---|
| DE | 10 2008 050 264 | 4/2010 |
| DE | 10 2010 025 218 | 12/2011 |
| DE | 10 2011 111 457 | 2/2013 |
| DE | 10 2013 000 932 | 7/2014 |
| DE | 10 2013 000 933 | 7/2014 |
| DE | 10 2017 002 646 | 9/2018 |
| EP | 1 953 286 | 8/2008 |

* cited by examiner

METHOD OF PRODUCING A MULTILAYER FILTER MEDIUM AND A FILTER MEDIUM PRODUCED IN ACCORDANCE WITH THIS METHOD

FIELD OF THE INVENTION

The invention relates to a method for producing a multilayer filter medium and to a filter medium produced in accordance with this method.

BACKGROUND OF THE INVENTION

A number of embodiments of such production methods and the assigned filter media are known.

DE 10 2013 000 932 A1 shows a filter medium, in particular provided for hydraulic filters, having at least one layer comprising at least one first structure having warp and weft threads and at least one further, second structure having predeterminable filtration properties. The respective first structure is formed at least in part from multifilaments in the form of twisted threads.

DE 10 2013 000 933 A1 discloses a multilayer filter medium for the filtration of fluids, which has at least one support layer, one filter layer and one drainage layer. An additional drainage layer forming a three-dimensional structure is provided to enlarge the flow channels formed for the fluid flowing therethrough.

DE 10 2010 025 218 A1 further discloses a multilayer filter medium, at least one side of which is contacted flatly by a support structure, which support structure has at least one individual fabric composed of weft and warp threads. At least one set of weft and/or warp threads extends beyond more than two adjacent warp and weft threads, respectively, to form a long-float weave.

The aforementioned documents relating to the prior art also describe production methods for obtaining such filter media in detail. Furthermore, filter media for fine filtration in automatic backwash filters (DE 10 2017 002 646 A1, DE 10 2011 111 457 A1) are in use on the market today, wherein regularly filter materials for the filter medium based on stainless-steel mesh are used. Compared to known slotted screens, micro strainers and similar screening materials, filter fabrics in the range from 5 µm to 100 µm generally offer a particularly high degree of open filter area. As a consequence, a high dirt holding capacity at minimal pressure loss is provided. The advantage of wire mesh over plastic fabric is that its mechanical and thermal stability is much higher. Furthermore, compared to woven polymer fibers having the identical fineness, woven wire mesh has thinner wires, and thus, a higher porosity for the respective fluid to be filtered. For this reason, almost exclusively stainless-steel mesh is used in automatic backwash filters.

Because of the periodic backwashing, the filter medium in the backwash filter is subjected to a high alternating load. The regular flow reversal and the constantly changing differential pressure put strain on the filter medium, the effects of which significantly limits the service life of the filter material and the filter medium, respectively.

To make the filter medium more stable and thus more durable, the fine wire mesh layers are often sintered to the coarser adjacent support layers and drainage layers. However, the higher mechanical stability purchased in this way has in practice resulted in the disadvantages listed below:

Sintered fabric structures are generally very expensive because of the associated complex and energy-intensive production method. The individual fabric layers have to be washed thoroughly and have to be calendered in advance to create more contact areas between the fabrics, which in turn reduces the open area. The sintering method mentioned is performed at high temperatures, usually a few degrees below the melting temperature of the stainless steel used, in a vacuum or in an inert gas atmosphere.

Sintering is usually a discontinuous process, and sintered fabrics are limited in size by the size of the furnaces used. Typical panel sizes are therefore approx. 1.2 m by 1.2 m. For producing filters, this means that frequently several panels have to be assembled for larger filtration devices, which generates additional work steps in the form of welding operations and associated additional costs. Co-sintered wire mesh is rigid and sheet-shaped, and for that reason can only be pleated to a limited extent. Furthermore, the porosity and the free open area of a sintered fabric structure decreases significantly, which means for the filtration process that the dirt holding capacity is reduced at higher pressure losses. Experience has shown that the performance losses because of sintered materials are in the order of magnitude of approx. 20 to 30%, with the consequence that such a filter device has to be designed significantly larger to be able to install the additional filter area required for a similar performance.

SUMMARY OF THE INVENTION

Based on this prior art, the invention addresses the problem of providing a method solution and product solution for a filter medium that is significantly improved compared to known solutions and that is also superior to a sintering of fabric layers for the filter media structure.

A method and a filter medium having the features of this invention solve this problem.

The method according to the invention and for producing a multilayer filter medium is characterized by the production steps listed below:
 providing a woven fabric layer having passage points for fluid;
 providing a nonwoven layer of a spunbonded nonwoven and having additional passage points for fluid; and
 joining the two superimposed layers along contact points by melting the nonwoven layer in such a way that while the additional passage points enlarge, the molten spunbonded nonwoven material flows at least in part to the contact points and then cumulatively cures there to produce firm connection points between the two layers.

Furthermore, a filter medium according to the invention, in particular produced by the above method, is characterized in that at least one metallic fabric layer is firmly bonded to an at least partially fused nonwoven layer of plastic material.

In contrast to the known filter media solutions, including the sintering of the wire meshes with each other, mechanical stabilization is achieved by using a fusible nonwoven as the nonwoven layer. Preferably, the weight per unit area of the fusible nonwoven is selected such and the thermal fusion bonding method is performed such that the fusible nonwoven creates a gap of high porosity between the wire meshes to be joined. In contrast to sintering of the wire mesh, where the individual layers have to be calendered in advance to form sufficient contact surfaces, the hotmelt adhesive keeps the individual fabric layers at a distance. This space between the fabric layers then acts as additional drainage layer, while the melted thermoplastic simultaneously bonds the fine filtration layer to the support layer and stabilizes the former. This drainage maximally utilizes the open filter area of the fine fabric as a filter medium.

In a preferred embodiment of the method according to the invention, provision is made that the thin nonwoven threads of the nonwoven layer are torn off during the melting process, so that the hotmelt adhesive formed by the nonwoven layer contracts in discrete spots, in particular where the fabric cover layers are not directly contacting each other in case of a filter medium having at least three layers. In that way, the filter medium forms spherical or island-like accumulations in the form of clusters. As a result, the wire mesh layers are finally bonded only at discrete spots and do not form a homogeneous bond across a large area. This maintains the high porosity in the fabric structure and continues to ensure a correspondingly high fluid permeability through the fabric material.

In comparison with sintered wire mesh structures and other filter media, the porosity and the free open area for filtration of a fabric structure connected in this way do not decrease at all. The fused structure is mechanically much more stable and, in terms of pressure losses and dirty holding capacity, similar to non-sintered filter media of the type mentioned above.

Compared to sintered wire mesh structures, which are formed rigid and sheet-shaped, the fusion-bonded structures still have a high degree of flexibility, which is advantageous during the desired backwashing of filter elements, because the individual fabric layers still have a certain freedom of movement owing to the bonding in discrete spots using a preferably thermoplastic filter material as nonwoven material. Also, contaminants embedded between the bonded fabrics can be flushed out more easily.

It has been shown that thermoplastic bridges between the individual adjacent fabric layers of the filter medium are formed by the spherical, island or cluster-shaped connection points. The thermoplastic bridges have a damping effect on the fabric during the load changes occurring with regard to the filtration to be performed in one direction and the backwashing of the filter element material to be performed in the opposite direction. This is without correspondence in the prior art.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are general views and are not to scale.

DETAILED DESCRIPTION OF THE INVENTION

Figure 1:
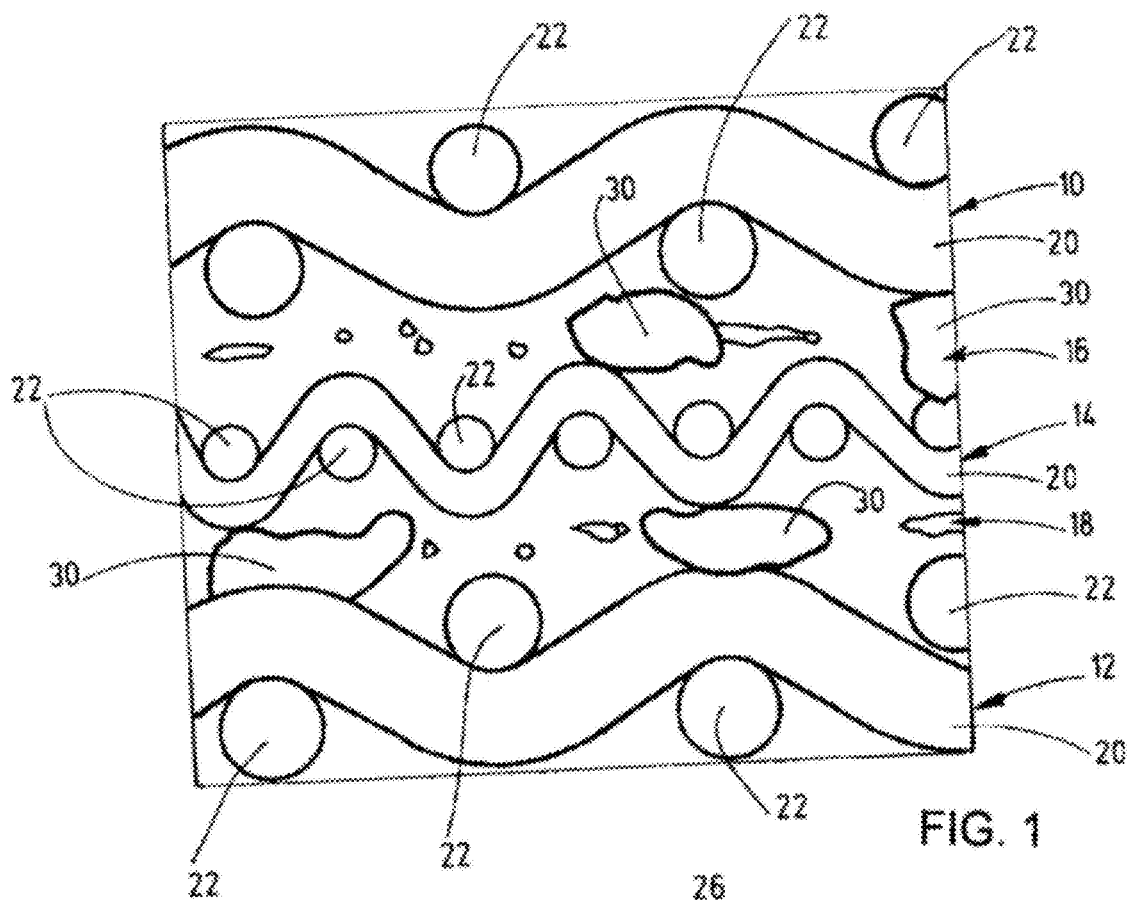
FIG. 1 is a side view, in an idealized form, of a section through a five-layer filter medium, the individual fabric layers of which are interconnected via island-shaped or cluster-shaped fusion points, according to an exemplary embodiment of the invention.

FIG. 1 shows in the manner of a cross-section, a preferred embodiment of the filter medium according to the invention using five layers 10, 12 and 14, 16 and 18. The illustration is idealized, because, owing to bonding, virtually two of the five layers no longer exist in their original structure to such an extent. The filter medium according to FIG. 1 is in itself a three-dimensional fabric body, wherein the layers 10, 12 are composed of warp and weft yarns 20, 22, whereas the layers 16 and 18 are formed from a spunbonded nonwoven. The fabric layers 10, 12 formed of warp and weft threads 20, 22, are preferably of plain weave, and the individual threads 20, 22 of each layer 10, 12 delimit individual passage points 24 having a square cross-section as exemplified in FIGS. 3 and 4 for the lower layer 12 as viewed in the direction of FIG. 1. In particular, in this embodiment, the fabric filter layer 10 has the same structure as the fabric layer 12. The actual filter fabric layer 14, which effects filtration, differs from the warp and weft thread layers 10, 12 in that it is formed from a filter braid, in which the individual threads 20, 22 do not form passage points having a free, square opening cross-section, but rather the threads 20, 22 are implemented to lie against each other in such a way that the fluid is deflected several times at the fabric threads 20, 22. In this respect, in the area where two adjacent threads are superimposed by the thread deflection a kind of three-dimensional filter pore is created, which filter pore is not sealed fluid-tight by the adjacent spunbonded or fusible nonwoven in the fused state.

The spunbonded nonwoven layers 16, 18 inserted between layers 10 and 14 as well as 14 and 12, are also conceived as three-dimensional surfaces. Such spunbonded nonwovens in the form of layers 16, 18 are basically known and represent a textile sheet structure formed of individual filaments 26. Immediately after being produced and pre-stretched, the filaments 26 are deposited onto a conveyor belt and thereby compressed. In so doing, the filaments 26 solidify as a result of the still present softening (thermoplastic property) and form the spunbonded nonwoven, wherein the mentioned solidification can also be achieved using chemical binding agents or by needling (Wikipedia). The individual filaments 26, shown in FIG. 2, for the spunbonded nonwoven delimit between each other further passage points 28 having varying free cross sections.

In the five-layer structure of a filter medium according to FIG. 1, the fabric layer 10 arranged uppermost in the direction of view of FIG. 1, is a square mesh fabric with individual wires, preferably having a wire thickness in the range of 0.15 mm to 0.25 mm, wherein the respective mesh size for forming the passage points 24 ranges from 100 to 600 μm. The main function of this first fabric layer 10 is to support and stabilize the sensitive central filter fabric layer 14, which is preferably designed as a "smooth braid". The information is only exemplary and in principle other mesh types having a comparable thickness/material strength and open filter area and mesh size can perform this task, respectively. The specified square mesh permits good foldability, especially for pleated filter media structures, wherein square mesh fabric can also be used when used in plain screen baskets inside backwash filter devices. Instead of the fabrics pointed out, expanded metals, weldmesh, micro strainers or slotted screens (all not shown) can also perform the respective tasks. In this exemplary embodiment, the bottom-most fabric layer 12 as viewed in FIG. 1, is identical to the first layer 10, although that is not mandatory.

The central fabric filter layer 14 is a braid fabric having a filter fineness of, for instance, 60 μm. By way of example, the wire thickness of the warp 20 here is 0.135 mm, and the wire thickness of the weft 22 is 0.09 mm. Such braid fabric is the finest fabric filter layer within the layer structure 10, 12, 14, and its filter fineness determines the overall cleaning performance. Furthermore, its passage points 24 constitute almost the entire flow resistance for the five-layer filter medium according to FIG. 1. Owing to their good backwashing properties, smooth plain Dutch weave fabrics having filter fineness of less than 100 µm, preferably filter fineness between 20 to 60 µm, are used in backwash filters of conventional structure. For such braid fabrics, the wire thicknesses for the warp threads 20 and the weft threads 22 are typically in the order of magnitude of 30 to 140 µm.

The spunbonded nonwoven filter layers 16, 18 are typically based on polyamide having filament thicknesses or fiber thicknesses of approximately 20 to 40 µm at a weight per unit area of approximately 5 to 40 grams per square meter and a nonwoven thickness of 0.25 mm, resulting in a porosity of 80%. In this exemplary embodiment, however, a co-polyamide spunbonded nonwoven is preferably used, having a melting range between 120 to 135° C. and an MFI value averaging 30 g/10 minutes at 160° C. The bonding temperature required for the manufacturing method according to the invention is 140 to 160° C. If necessary, other thermoplastics can also be used for the spunbonded nonwoven layer 16, 18, for instance polyester or polyolefin materials. Depending on the choice of spunbonded nonwoven material, the material resistance and chemical resistance, respectively, of the finished filter medium can also be adapted to the respective requirements in practice, wherein all layers 10, 12, 14, 16 and 18 contribute to the overall filter performance of the element material.

The manufacturing method according to the invention is now characterized in that the individual layers 10, 12, 14, 16 and 18, as shown in FIG. 1, are superposed with their respective three-dimensional areal extension, as shown. As a result of an appropriate melting of the spunbonded nonwoven material at the temperatures of 140 to 160° C. mentioned, the individual, continuous filaments 26 shown in FIG. 2 tear, because of the surface tension of the plastic material, the filaments 26 shrink to form island-shaped or cluster-shaped contact points 30, leaving, as shown in FIG. 1, only individual residual filaments 32, which are separated from one another. Such fusion bonds between the individual layers are manufactured under pressure, for instance by a press or parts of a folding machine acting on the upper and/or lower fabric layer 10, 12 (not shown) during the heating method. The layer joining process can be performed continuously, in particular when using conventional folding machines for pleating the filter medium.

Figure 2:
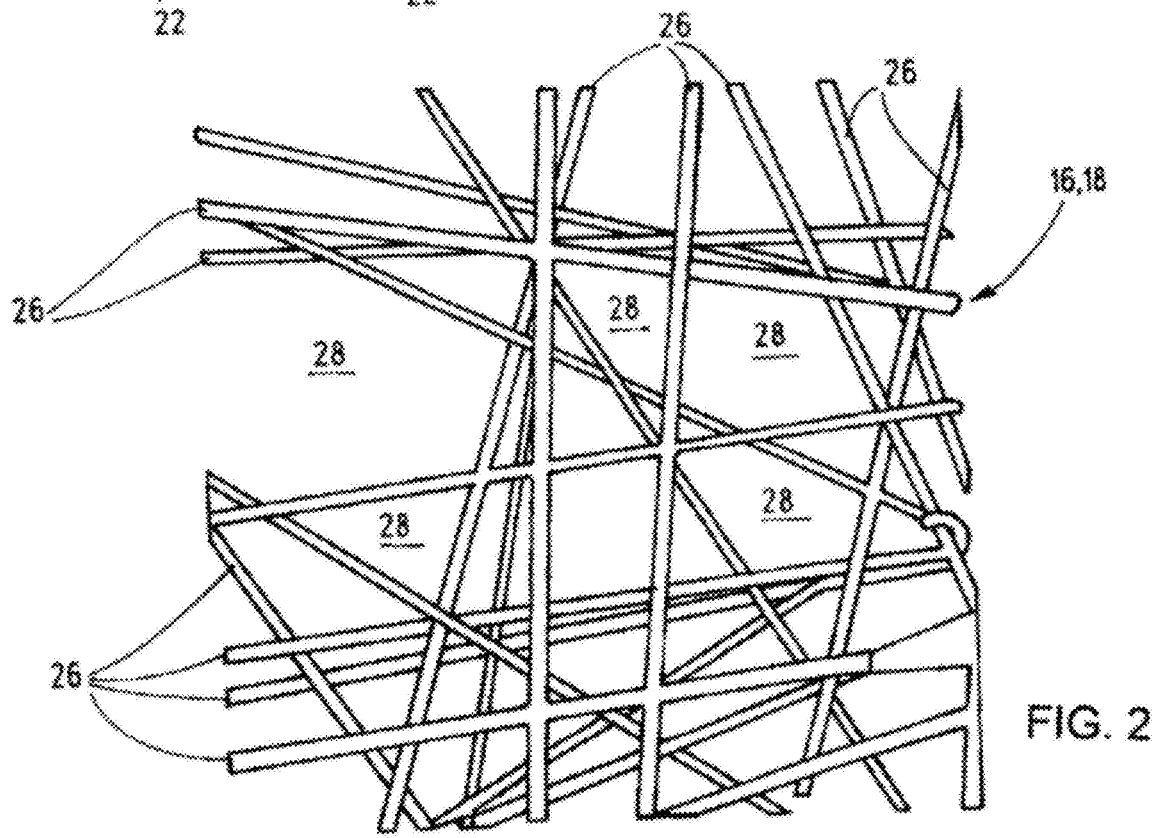
FIG. 2 is a top view of a segment of a spunbonded nonwoven as is used in the filter medium of FIG. 1.
Figure 3:
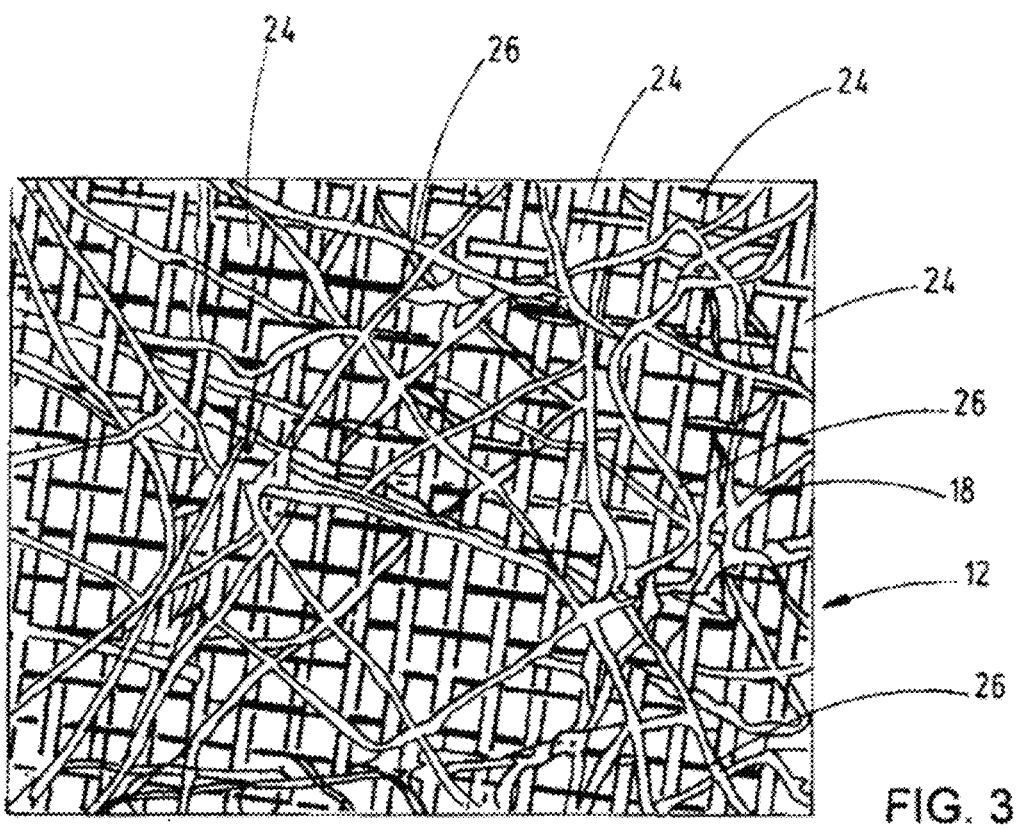
FIGS. 3 and 4 are plan views of a segment of the filter medium of FIG. 1, in which the spunbonded nonwoven of FIG. 2 is laid on an underlying wire mesh layer, in the partially unbonded and in the fully bonded, fused state, respectively.
Figure 4:
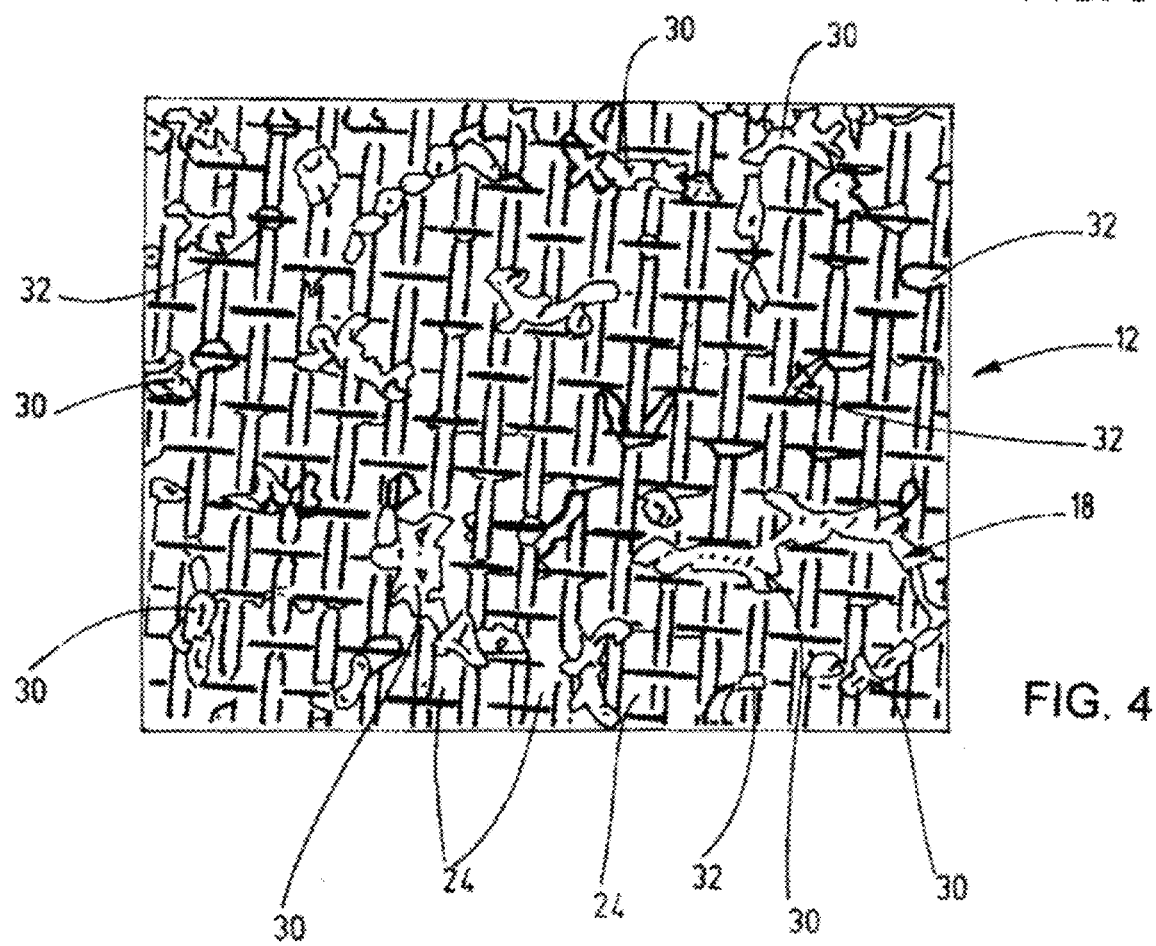

In particular, FIGS. 3 and 4 show how at first the filament material according to FIG. 2 is merely placed on the lower fabric layer 12 (see FIG. 3), and then the cluster-like contact points 30 are formed (see FIG. 4) in the subsequent heating process while the filaments 26 are torn open. The amount of hotmelt adhesive in the form of the material entry for the spunbonded nonwoven layers 16, 18 and the contact pressure during the folding process for a pleated filter medium can be used to adjust the porosity of the overall structure. Because the nonwoven filter layers 16, 18, based on the above-mentioned thermoplastics and having low weights per unit area, require only low operating temperatures compared to sintering the wire mesh, the manufacture of such a fabric structure, as shown in FIG. 1, by way of example, proves to be less energy-intensive and consequently much more cost-effective. Calendaring of individual fabrics is not required for bonding, which preserves the open area of the fine fabric in the form of the central filter layer 14 to a maximum. This omits a further work step and again saves money.

The process of bonding addressed here can in general be performed continuously in a folding machine (not shown) immediately after the folding process for a pleated filter mat. This process is possible because at below 200° ° C. the temperatures are relatively low and no inert gas atmosphere is required. The production of a pleated mesh pack as a filter medium having stabilized pleats is then performed in one single step, so to speak; namely, the fabrics are folded and the mesh pack produced is heated immediately behind the folding knife using a trace heating. This procedure has the advantage that during the thermal bonding process, the required pressure can also be permanently applied to the fabric layers during the joining process, and in that way the individual fabric layers can enter a defined bond with each other.

Because the bonding of the individual fabric layers takes place immediately after the pleats have been folded, the individual fabric layers in this way can be pleated without any problems. In this respect, the risk of folds breaking is practically eliminated, because the individual layers 10, 12, 14, 16, 18 still have sufficient freedom of movement during folding.

Bonding the fabric layers 10, 12, 14 by thermoplastic spunbonded nonwovens in the form of layers 16, 18 permits the production of mechanically stable fabric structures at a comparatively low material input and space requirements. In principle, supporting fabric layers can be chosen thinner, whereby more filter material can be accommodated in the same space when the fabrics are folded, which in turn increases the power density of the overall filtration device, and for a given power, the respective filter apparatus can be formed to be correspondingly geometrically smaller than the known solutions.

According to an embodiment not shown in more detail, it is also possible to provide the fabric layers 10, 12 shown at the top and bottom in FIG. 5 and acting as drainage, with additional protective layers and support layers. In addition to additional grids or perforated plates, helical wire coils extending around the outer circumference can also be used for this purpose, as shown by way of example in DE 102 202 73 A1.

The five-layer structure according to in FIG. 1 is not mandatory for the implementation of the method solution according to the invention. Thus, structures having more than five layers can also be manufactured; preferably, however, also filter media having only three layers. However, it may suffice, possibly as a preliminary stage for a more complex filter medium in terms of the invention, to combine just one fabric filter layer with a nonwoven filter layer, as explained. The filter medium produced in this way can be planar or pleated to form a hollow cylinder (not shown), in order to be provided at the ends with end caps or other end parts and to result in an independent commercial filter element (not shown). The filter element material and the filter elements, respectively, manufactured using the method are intended as backflushing elements, in particular for use in backflushing filter devices, and are particularly suitable for solid-liquid separation of low-viscosity fluids. In addition to backwash filter applications in water filtration, the technology can also be used in backwash filters for lube oil filtration, in particular in high-volume engines.

Spunbonded nonwovens made of polyamide material, having a weight per unit area of 8 g/m² and melting temperatures of approximately 130-140° C., have proved to be well suited for use as sheet structures. In this respect, the melting time for the bond is approx. 15 minutes, so that short melting times are achieved at a low melting point. In particular, it becomes apparent that the fused-on spunbonded nonwovens contract to the desired extent.

Multilayer filter media having a structure using a square mesh fabric of 250 µm for the support fabric (w=0.25 mm; d=0.2 mm) have proven to be particularly advantageous. This is followed by a spunbonded nonwoven made of polyamide, having a weight per unit area of 8 g/m² and then a fine filter fabric, e.g. in the form of a smooth filter braid with 50 µm (Mesh: 72×380; warp: 112 µm; weft wire: 73 µm. In sequence, then a polyamide spunbonded nonwoven having a weight per unit area of 8 g/m² is used again, and subsequently a support fabric in the form of a square mesh fabric 250 µm (w=0.25 mm; d=0.2 mm) is provided again.

While one embodiment has been chosen to illustrate the invention, it will be understood by those skilled in the art that various changes and modifications can be made therein without departing from the scope of the invention as defined in the claims.

The invention claimed is:

1. A method of producing a five-layer structure, multilayer filter medium, comprising at least the production steps of:
   providing a first outer woven fabric layer having first passage points for fluid and being a square-mesh fabric capable of drainage during fluid filtration;
   providing a second outer woven fabric layer having second passage points for fluid and being a square-mesh fabric capable of drainage during fluid filtration;
   providing a central woven fabric layer being positioned between the first and second outer woven fabric layers, the central woven fabric having third passage points for fluid and being a braid fabric forming a filter layer capable of actual particle removal from the fluid;
   providing first and second nonwoven layers each being of a spunbonded nonwoven and each having fourth passage points for fluid, the first nonwoven being positioned between the first outer woven fabric and the central woven fabric, the second nonwoven being positioned between the second outer woven fabric and the central woven fabric; and
   joining the first and second outer woven fabric layers to opposite sides of the central woven layer with the first and second nonwoven layers along contact points by melting the first and second nonwoven layers in such a way that while the fourth passage points enlarge, melted spunbonded nonwoven materials of the first and second nonwoven layers flow at least in part to the contact points and then cumulatively cure at the contact points producing firm connection points between the first and second outer woven layers, the central woven fabric layer and the first and second nonwoven layers.

2. The method according to claim 1 wherein
   the first and second nonwovens layers, during melting thereof, while at least partially losing filament structure of the first and second nonwovens layers and under action of surface tension of the melted nonwoven material, flows together to form spherical or cluster-shaped nodes at the contact points, from which subsequently solid connection points are formed by curing.

3. The method according to claim 1 wherein
   the first and second outer woven fabric layers and the central woven fabric layer are each composed of warp threads and weft threads; and
   the first and second nonwoven filter layers are each formed of at least one plastic thread material.

4. The method according to claim 1 wherein
   the first and second outer woven layers, the central woven fabric layer and the first and second nonwoven layers are arranged between protective and/or supporting layers each formed from a perforated plate, a grid or a helical wire coil.

5. The method according to claim 1 wherein
   the first and second outer woven layers, the central woven fabric layer and the first and second nonwoven layers are smooth-surfaced or pleated and are erected to form a hollow cylinder forming a filter element or a precursor of a filter element.

6. The method according claim 1 wherein
   at least during the melting of the first and second nonwoven layers, the first and second outer woven layers, the central woven fabric layer and the first and second nonwoven layers form a layer composite obtained by applying a pressing force.

7. The method according claim 1 wherein
   the first and second outer woven layers and the central woven fabric layer are formed of metallic threads; and
   the first and second nonwoven layers are formed of plastic threads.

8. A five-layer structure, multilayer filter medium, comprising:
   a first outer woven fabric layer having first passage points for fluid and being a square-mesh fabric capable of drainage during fluid filtration;
   a second outer woven fabric layer having second passage points for fluid and being a square-mesh fabric capable of drainage during fluid filtration;
   a central woven fabric layer being positioned between the first and second outer woven fabric layers, the central woven fabric having third passage points for fluid and being a braid fabric forming a filter layer capable of actual particle removal from the fluid;
   first and second nonwoven layers each being of a spunbonded nonwoven and each having fourth passage points for fluid, the first nonwoven being positioned between the first outer woven fabric and the central woven fabric, the second nonwoven being positioned between the second outer woven fabric and the central woven fabric; and
   a joining of the first and second outer woven fabric layers to opposite sides of the central woven layer with the first and second nonwoven layers along contact points by melted portions of the first and second nonwoven layers in such a way enlarging the fourth passage points, the melted portions being melted spunbonded nonwoven materials of the first and second nonwoven layers that flowed at least in part to the contact points and cumulatively cured at the contact points forming firm connection points between the first and second outer woven layers, the central woven fabric layer and the first and second nonwoven layers.

9. The five-layer structure, multilayer filter medium according to claim 8 wherein the first and second nonwovens layers at least partially lost filament structure of the first and second nonwovens layers and form spherical or cluster-shaped nodes at the contact points, from which subsequently solid connection points are formed by curing.

10. The five-layer structure, multilayer filter medium according to claim 8 wherein
    the first and second outer woven fabric layers and the central woven fabric layer are each composed of warp threads and weft threads; and
    the first and second nonwoven filter layers are each formed of at least one plastic thread material.

11. The five-layer structure, multilayer filter medium according to claim 8 wherein the first and second outer woven layers, the central woven fabric layer and the first and second nonwoven layers are arranged between protective and/or supporting layers each formed from a perforated plate, a grid or a helical wire coil.

12. The five-layer structure, multilayer filter medium according to claim 8 wherein the first and second outer woven layers, the central woven fabric layer and the first and second nonwoven layers are smooth-surfaced or pleated and are erected to form a hollow cylinder forming a filter element or a precursor of a filter element.

13. The five-layer structure, multilayer filter medium according claim 8 wherein the first and second nonwoven layers, the first and second outer woven layers, the central woven fabric layer and the first and second nonwoven layers form a layer composite obtained by applying a pressing force.

14. The five-layer structure, multilayer filter medium according claim 8 wherein
the first and second outer woven layers and the central woven fabric layer are formed of metallic threads; and
the first and second nonwoven layers are formed of plastic threads.

15. The five-layer structure, multilayer filter medium according claim 13 wherein the composite is backwashable.

* * * * *